United States Patent [19]

Okamura et al.

[11] Patent Number: 4,682,259

[45] Date of Patent: Jul. 21, 1987

[54] MAGNETIC TAPE CASSETTE WITH DUSTPROOF MECHANISM

[75] Inventors: Masatoshi Okamura, Saku; Haruo Shiba, Komoro; Kenji Hashizume; Yoshiya Sakata, both of Saku, all of Japan

[73] Assignee: TDK Corporation, Tokyo, Japan

[21] Appl. No.: 765,585

[22] Filed: Aug. 14, 1985

[30] Foreign Application Priority Data

Aug. 15, 1984 [JP] Japan .......................... 59-124032[U]

[51] Int. Cl.$^4$ ............................................. G11B 23/02
[52] U.S. Cl. ...................................... 360/132; 242/199
[58] Field of Search ............................. 360/132, 93; 242/199–200; 206/387

[56] References Cited

U.S. PATENT DOCUMENTS

| 4,418,373 | 11/1983 | Fujimoro et al. | 360/132 |
| 4,527,691 | 7/1985 | Pertzsch et al. | 360/132 X |
| 4,556,153 | 12/1985 | Takagi et al. | 360/132 X |

FOREIGN PATENT DOCUMENTS

| 58-100281 | 6/1983 | Japan | 360/132 |
| 58-164067 | 9/1983 | Japan | 360/132 |

Primary Examiner—John H. Wolff
Attorney, Agent, or Firm—Seidel, Gonda, Goldhammer & Abbott

[57] ABSTRACT

A magnetic tape cassette, especially a video tape cassette, including front and inner lids is equipped with spring fitted on pivot of the inner lid and engaged at one free end with the front lid and at the other end with the inner lid to bias the latter in the closing direction to provide dustfree protection for the magnetic tape inside.

3 Claims, 4 Drawing Figures

MAGNETIC TAPE CASSETTE WITH DUSTPROOF MECHANISM

BACKGROUND OF THE INVENTION

This invention relates to a magnetic tape cassette, and more specifically to a mechanism for preventing ingress of dust from the outside into a video tape cassette.

A typical prior art arrangement will first be explained with reference to FIGS. 1 to 3 illustrating the present invention. Conventionally, a magnetic tape cassette, notably a video cassette housing for 8 mm video tape, comprises, as shown in FIG. 1, a front lid 11, inner lid 12, upper half housing part 13, lower half housing part 16, and reels 14, 14'. The front lid 11 is connected to the upper half housing part 13, with a pair of pivots 3, 3,' on the lid engaged with corresponding openings 4, 4' formed in the housing part, imparting some freedom of turning to the lid 11 which is normally urged to the closing position with a spring on one of the pivot3, 3'. The front lid 11 has openings 2, 2' adapted to engage pivots 1, 1' of the inner lid 12, whereby the turning motion of the front lid 11 is transmitted to the inner lid 12, allowing the latter to rotate relative to the former. Thus, when the two lids are in the closing position they protect the magnetic tape portion held there-between, and as the front lid turns upward, the inner lid also turns open to expose the tape. The upper and lower half housing parts 13, 16 are securely joined, with holes and hollow columns 5, 5', 15, 15' of the lower part mated with internally threaded holes 6, 6', 7, 7' of the upper part by screws. The upper and lower half housing parts 13, 16 are formed with pairs of guide groove walls 8, 8' (8' being not shown in FIG. 1), and 9, 9', respectively, so that when the two half parts are mated together a pair of guide grooves result. Inner lid guide pins 10, 10' are fitted, respectively, in the guide groove 17 (shown in FIG. 2) defined by the guide groove walls 8, 9 and in the guide groove 17' defined by the guide groove walls 8', 9' (FIG. 2). The construction described enables the inner lid guide pins 10, 10' to slide along the guide grooves 17, 17' with the rotation of the front lid 11 as illustrated in FIG. 2. FIG. 3 shows the relative positiions of the front lid 11, inner lid 12, and inner lid guide pin 10', when the front lid is closed.

In the conventional magnetic tape cassette, especially video tape cassette, of such design, as can be seen from FIG. 3, the finally closed inner lid position with the front lid closed is governed by the position of the inner lid guide pin 10', and the posiiton of the pin 10', in turn, is dictated by the guide groove 17'. Long-time use of the cassette designed in this way or the dimensional tolerance for the cassette will add to the play between the guide groove 17' and the inner lid guide pin 10'. Eventually an excessive play will result between the inner lid pivot 1' and the front lid opening. This can produce a gap at 20 where the front lid 11 and inner lid 12 normally are in contact when the front lid 11 is in the closed position. The gap then admits dust from the outside into the cassette housing, and the dust deposit on the magnetic tape can result in deteriorated video picture quality.

SUMMARY OF THE INVENTION

This invention has for its object to provide a magnetic tape cassette, especially a video tape cassette, with an appropriate dustproof mechanism to protect the magnetic tape surface and prevent deterioration of the video picture quality.

The invention thus provides a magnetic tape cassette of the type described including a front lid openably pivoted at the front of the cassette housing and an inner lid turnably supported by the front end, characterized in that the inner lid is normally urged toward the front lid by coil springs.

According to this invention, the object defined above is achieved because the inner lid is properly closed with respect to the front lid regardless of use over a long period of time or of scatter of dimensions within the tolerance limits.

DESCRIPTION OF THE PREFERRED EMBODIMENT

Figure 1:
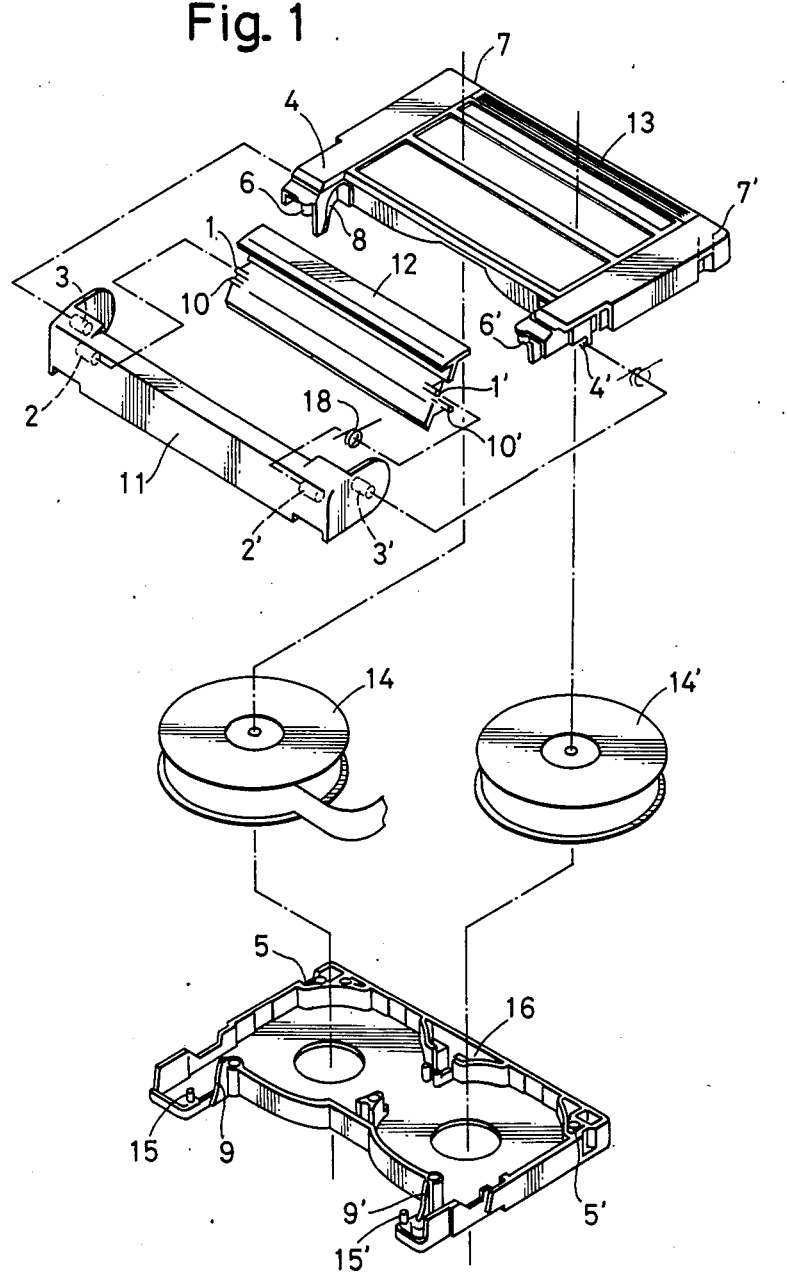
FIG. 1 is an exploded view of a general magnetic tape cassette assembly, especially of a video tape cassette assembly, embodying the invention.
Figure 2:
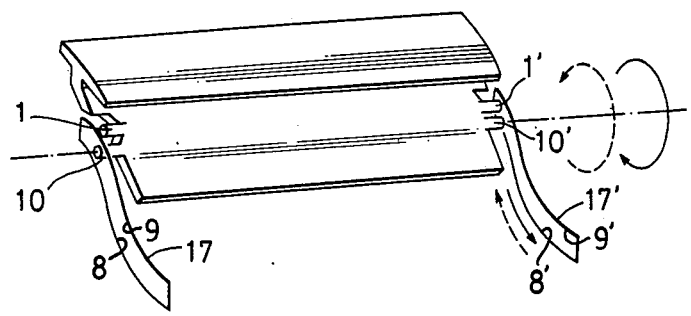
FIG. 2 is a schematic perspective view illustrating that the inner lid slides along guide grooves as the front lid turns.
Figure 3:
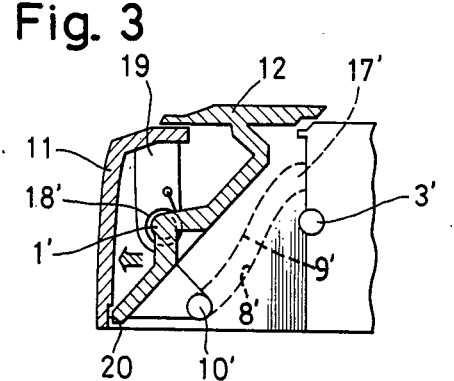
FIG. 3 is a sectional view showing how the inner lid is located when the front lid is closed.
Figure 4:
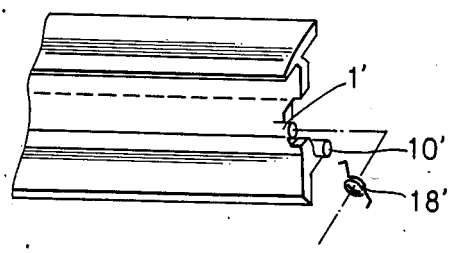
FIG. 4 is a perspective view showing one of the coil springs fitted on a pivot of the inner lid.

Referring to FIGS. 1, 3, and 4, where like parts explained above are given like numerals, coil spring 18 is fitted, on one of the inner lid pivots 1, 1'. The coil spring 18 is engaged at one free end with support 19 of the front lid 11 and at the other free end with the inner lid 12, biasing the latter in the closing direction (indicated by an arrow in FIG. 3). If desired the spring 18 may be provided on each pivot.

As the front lid 11 turns in the closing direction under the action of a spring on one of the pivots 3, 3', the coil spring 18 is compressed, building up recovery forces at the free end of the spring engaged with the inner lid 12. FIG. 3 typifies the recovery or springback force by the arrow. As shown, this springback force of the coil spring 18, produced upon closing of the front lid 11, can be utilized to secure a tight closure, eliminating the gap 20 between the inner lid 12 and the front lid 11 which would other wise result from the play between the inner lid guide pin 10' and the guide groove 17' and also from the play between the inner lid pivot 1' and the corresponding front lid opening.

According to the present invention, as described above, the magnetic tape in a cassette housing can be protected by a partial modification of the cassette assembly, that is, by the provision of coil springs between the front lid and the inner lid. Since it does not require a major change in the design of conventional cassette housing assembly, the present invention permits substantially the direct use of the ordinary production process and the existing equipment. The favorable functional effects of the invention should be obvious when it is taken into account that the protection of the magnetic tape against dust further makes it possible to avoid the deterioration of the video picture quality.

What is claimed is:

1. A magnetic tape cassette including:
   a housing having an opened front portion and being defined by mated upper and lower parts;
   a front lid pivotally mounted at the front portion for movement between an opened and closed position, said front lid normally being biased to said closed position;

an inner lid having two opposed ends and having a pivot at each end for engagement of said front lid, said inner lid being adapted for movement between an opened and closed position, when said front and inner lids are in their closed positions, a magnetic tape which is located between said lids is protected, and when said front and inner lids are in their opened positions said magnetic tape is exposed;

comprises:

a coil spring having a first and second end and being fitted on one of said pivots of said inner lid, said first end being engaged with said front lid, said second end being engaged with said inner lid, such that said inner lid is normally urged to its said closed position;

a guide pin being provided on said end of said inner lid;

said housing having a groove for receipt of said guide pin;

whereby when said front lid is moved to said opened position, said guide pin of said inner lid travels in said groove thereby moving said inner lid into said opened position.

2. The magnetic tape cassette according to claim 1, wherein each said pivot is a projection from the end of said inner lid and is received in opening formed in an end of said front lid.

3. A magnetic tape cassette according to claim 1 wherein said coil spring is fitted on each said pivot.

* * * * *